US012226950B2

(12) United States Patent
Visser et al.

(10) Patent No.: US 12,226,950 B2
(45) Date of Patent: *Feb. 18, 2025

(54) METHOD OF 3D PRINTING A CELLULAR SOLID

(71) Applicant: UNIVERSITEIT TWENTE, Enschede (NL)

(72) Inventors: Claas Willem Visser, Enschede (NL); Dahlia Ningrum Amato, Troy, NY (US); Jennifer A. Lewis, Cambridge, MA (US); Jochen Mueller, Somerville, MA (US)

(73) Assignee: UNIVERSITEIT TWENTE, Enschede (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,266

(22) Filed: May 10, 2023

(65) Prior Publication Data

US 2023/0278278 A1 Sep. 7, 2023

Related U.S. Application Data

(63) Continuation of application No. 17/265,396, filed as application No. PCT/US2019/044792 on Aug. 2, 2019, now Pat. No. 11,685,108.

(Continued)

(51) Int. Cl.
*B29C 64/112* (2017.01)
*B29C 64/188* (2017.01)
(Continued)

(52) U.S. Cl.
CPC .......... *B29C 64/112* (2017.08); *B29C 64/188* (2017.08); *B29C 64/209* (2017.08);
(Continued)

(58) Field of Classification Search
CPC ... B29C 64/112; B29C 64/188; B29C 64/209; B29C 64/236; B29C 64/245;
(Continued)

(56) References Cited

U.S. PATENT DOCUMENTS

| 4,415,512 A | 11/1983 | Torobin |
| 4,582,534 A | 4/1986 | Torobin |

(Continued)

FOREIGN PATENT DOCUMENTS

| CN | 105027690 A | 11/2015 |
| CN | 105313332 A | 2/2016 |
| CN | 105729803 A | 7/2016 |

OTHER PUBLICATIONS

Chung, "Fabricating Scaffolds by Microfluidics," *Biomicrofluidics*, 3 (2009) pp. 022403-1-022403-9.

(Continued)

*Primary Examiner* — Jerzi H Moreno Hernandez
(74) *Attorney, Agent, or Firm* — Crowell & Moring LLP

(57) ABSTRACT

A method of printing a cellular solid by direct bubble writing comprises introducing an ink formulation comprising a polymerizable monomer and a gas into a nozzle, which includes a core flow channel radially surrounded by an outer flow channel. The ink formulation is directed into the outer flow channel and the gas is directed into the core flow channel. The ink formulation and the gas are ejected out of the nozzle as a stream of bubbles, where each bubble includes a core comprising the gas and a liquid shell overlying the core that comprises the ink formulation. After ejection, the polymerizable monomer is polymerized to form a solid polymeric shell from the liquid shell, and the bubbles are deposited on a substrate moving relative to the nozzle. Thus, a polymeric cellular solid having a predetermined geometry is printed.

30 Claims, 6 Drawing Sheets

Related U.S. Application Data

(60) Provisional application No. 62/714,892, filed on Aug. 6, 2018.

(51) Int. Cl.

| | | |
|---|---|---|
| *B29C 64/209* | (2017.01) | |
| *B29C 64/236* | (2017.01) | |
| *B29C 64/245* | (2017.01) | |
| *B33Y 10/00* | (2015.01) | |
| *B33Y 40/20* | (2020.01) | |
| *B33Y 70/00* | (2020.01) | |
| *B29K 105/00* | (2006.01) | |
| *B29K 105/04* | (2006.01) | |
| *B29K 105/16* | (2006.01) | |

(52) U.S. Cl.
CPC .......... *B29C 64/236* (2017.08); *B29C 64/245* (2017.08); *B33Y 10/00* (2014.12); *B33Y 40/20* (2020.01); *B33Y 70/00* (2014.12); *B29K 2105/0002* (2013.01); *B29K 2105/045* (2013.01); *B29K 2105/162* (2013.01)

(58) Field of Classification Search
CPC ......... B33Y 10/00; B33Y 40/20; B33Y 70/00; B29K 2105/0002; B29K 2105/045; B29K 2105/162
See application file for complete search history.

(56) References Cited

U.S. PATENT DOCUMENTS

| | | | |
|---|---|---|---|
| 4,671,909 A | 6/1987 | Torobin | |
| 4,867,931 A | 9/1989 | Cochran, Jr. | |
| 5,212,143 A | 5/1993 | Torobin | |
| 5,397,759 A | 3/1995 | Torobin | |
| 11,685,108 B2 * | 6/2023 | Visser | B29C 64/112 264/308 |
| 2011/0015288 A1 | 1/2011 | Ranft et al. | |
| 2011/0020630 A1 | 1/2011 | Gladysz et al. | |
| 2011/0091972 A1 | 4/2011 | Lin et al. | |
| 2013/0156952 A1* | 6/2013 | Keinath | B29C 64/112 427/256 |
| 2013/0309770 A1 | 11/2013 | Lin | |
| 2015/0366073 A1 | 12/2015 | Magdassi et al. | |
| 2017/0312981 A1* | 11/2017 | Selbertinger | B29C 64/112 |
| 2018/0142108 A1 | 5/2018 | Lewis et al. | |
| 2020/0109300 A1 | 4/2020 | Wu et al. | |

OTHER PUBLICATIONS

Hendricks, "Liquid Drop Technique for Generation of Organic Glass and Metal Shells," *2nd Convention of the International Colloquium on Drops and Bubbles*, Monterex, California (981) pp. 124-128.

Kendall, "Experiments on Annular Liquid Jet Instability and on the Formation of Liguid Shells," *Phys. Fluids*, 29, 7 (1986) pp. 2066-2094.

Mu, "Porous Polymeric Materials by 3D Printing of Photocurable Resin," *Materials Horizons*, 4 (2017) pp. 442-229.

Muth, "Architected Cellular Ceramics with Tailored Stiffness Via Direct Foam Writing," *PNAS*, 114, 8 (2017) pp. 1832-1837.

Quell, "Monodisperse Polystyrene Foams via Microfluidics—A Novel Templating Route," *Advanced Engineering Materials*, DOI: 10.1002/adem.201500040 (2015) pp. 1-6.

Wang, "A Highly Organized Three-Dimensional Alginate Scaffold for Cartilage Tissue Engineering Prepared by Microfluidic Technology," *Biomaterials*, 32 (2011) pp. 1718-1726.

International Search Report and Written Opinion from corresponding International Application No. PCT/US2019/044792, Nov. 29, 2019, 17 pgs.

Chinese Office Action, issued Jul. 17, 2023, in corresponding Chinese application No. 201980052637.6, including English language machine translation, 12 pgs.

* cited by examiner

◇ Monodisperse  ✱ Bidisperse

FIG. 7A
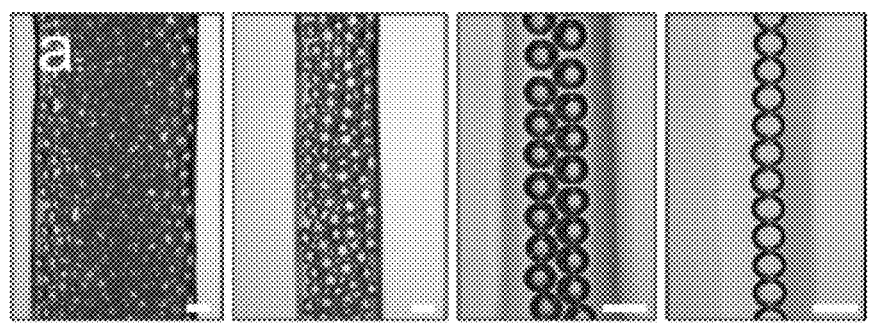
FIG. 7B
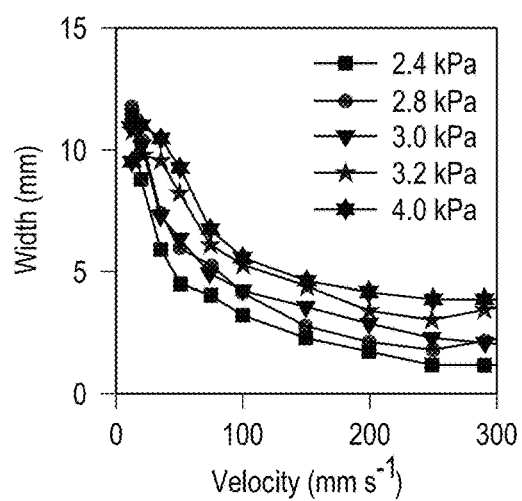
FIG. 8A
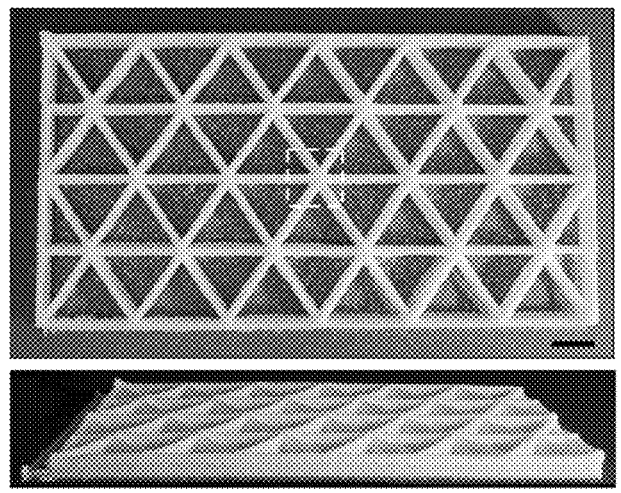
FIG. 8B
FIG. 8C
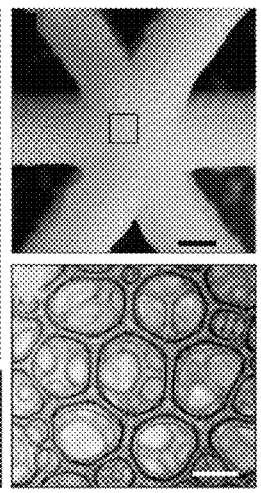
FIG. 8D

METHOD OF 3D PRINTING A CELLULAR SOLID

RELATED APPLICATION

The present patent document is a continuation of U.S. patent application Ser. No. 17/265,396, which was filed on Feb. 2, 2021, and is the U.S. national stage of PCT/US2019/044792, which was filed on Aug. 2, 2019, and which claims the benefit of priority under 35 U.S.C. § 119(e) to U.S. Provisional Patent Application No. 62/714,892, which was filed on Aug. 6, 2018. All of the aforementioned patent applications are hereby incorporated by reference in their entirety.

TECHNICAL FIELD

The present disclosure is related generally to three-dimensional printing (3D printing) and more particularly to 3D printing of porous structures or cellular solids.

BACKGROUND

With the growing need for lightweight, high-performance structural materials, cellular solids have become increasingly relevant over the past several decades. The microarchitecture of cellular solids provides highly tunable functional properties, and thus they are ubiquitous in nature and industry. Cellular solids found in nature may exhibit density gradients, locally controlled cell sizes, and interconnectivities within complex three-dimensional (3D) shapes, which may allow functional performance to be optimized with minimal material use. For example, the stiff surface and porous core of bone and feathers provide a remarkable resistance to bending and crack propagation without sacrificing low density and perfusability by blood vessels. Synthetic cellular solids have numerous current and potential applications, such as thermal insulation, battery electrodes, separation, scaffolds for artificial tissues, pressure sensors, and personal protective gear, owing to their tunable mechanical properties, low density, and high surface-to-volume ratio.

The mechanical, thermal, acoustic, and electrical properties of cellular solids are primarily defined by the porosity, the constituent material, and the interconnectivity between cells (i.e., open- vs. closed-cell architectures). Since observations from nature suggest that local control of the microarchitecture may be a prerequisite for functional optimization, bulk techniques have been modified to fabricate graded porous solids. However, these techniques are limited to molded parts with relatively uncontrolled cellular architectures. Additive manufacturing has also been explored for fabricating cellular solids; however, current technologies may demonstrate an exclusivity between structural control and build speed.

BRIEF SUMMARY

A method of printing a cellular solid with a predetermined micro- and macro-architecture is described.

The method comprises, according to one embodiment, introducing an ink formulation and a gas into a nozzle, which includes a core flow channel radially surrounded by an outer flow channel. The ink formulation is directed into the outer flow channel and the gas is directed into the core flow channel. The ink formulation and the gas are ejected out of the nozzle as a stream of bubbles, where each bubble includes a core comprising the gas and a liquid shell overlying the core that comprises the ink formulation. After ejection, the liquid shell is solidified to form a solid shell, and the bubbles are deposited on a substrate moving relative to the nozzle. Thus, a cellular solid having a predetermined geometry is printed.

The method comprises, according to another embodiment, introducing an ink formulation comprising a flowable polymer precursor, such as a polymerizable monomer, and a gas into a nozzle, which includes a core flow channel radially surrounded by an outer flow channel. The ink formulation is directed into the outer flow channel and the gas is directed into the core flow channel. The ink formulation and the gas are ejected out of the nozzle as a stream of bubbles, where each bubble includes a core comprising the gas and a liquid shell overlying the core that comprises the ink formulation. After ejection, the flowable polymer precursor is cured to form a solid polymeric shell, and the bubbles are deposited on a substrate moving relative to the nozzle. Thus, a polymeric cellular solid having a predetermined geometry is printed.

BRIEF DESCRIPTION OF THE DRAWINGS

FIG. 7A shows images of exemplary filaments formed by translation of the nozzle at a velocity of 35 mm/s, 70 mm/s, 150 mm/s, and 250 mm/s, respectively (left to right), at a gas pressure of 2.4 kPa. Each filament is made up of a plurality of bubbles, and the scale bars represent 1 mm.

FIG. 7B shows a plot of filament width versus translation velocity of the nozzle as a function of gas pressure.

FIGS. 8A-8D shows images of a cellular solid comprised of filaments arranged in a logpile geometry that underwent printing at a pressure of 4 kPa and a velocity of 60 mm/s. Scale bars represent 50 mm, 5 mm and 0.5 mm, respectively.

DETAILED DESCRIPTION

Described herein is a high-throughput additive manufacturing method in which a train of bubbles—each made up of a flowable material encapsulating a gas—may be ejected from a nozzle towards a substrate and solidified in-situ, allowing a foam or cellular solid to be fabricated in a layer-by-layer 3D printing process that may be referred to as direct bubble writing. The cellular solid may have a relative density and an open- and/or closed-cell architecture that can be independently and locally controlled. As discussed below, the transition between open and closed cells within the cellular solid may be controlled by the gas type, and the relative density may be controlled by the gas pressure. The macroscopic shape of the cellular solid is also programmable due to the nature of the bubble writing process; for example, bulk materials, filaments, lattices, shells, and out-of-plane pillars have been demonstrated. Arbitrary shapes may also be formed. Control over the micro- and macroscopic architectures can provide tunability of the local mechanical, electrical, and transport properties of the cellular solids, enabling tailored materials for pressure sensing, sound control, heat exchange, catalysis, mechanical energy absorption and/or other applications.

Figure 1:
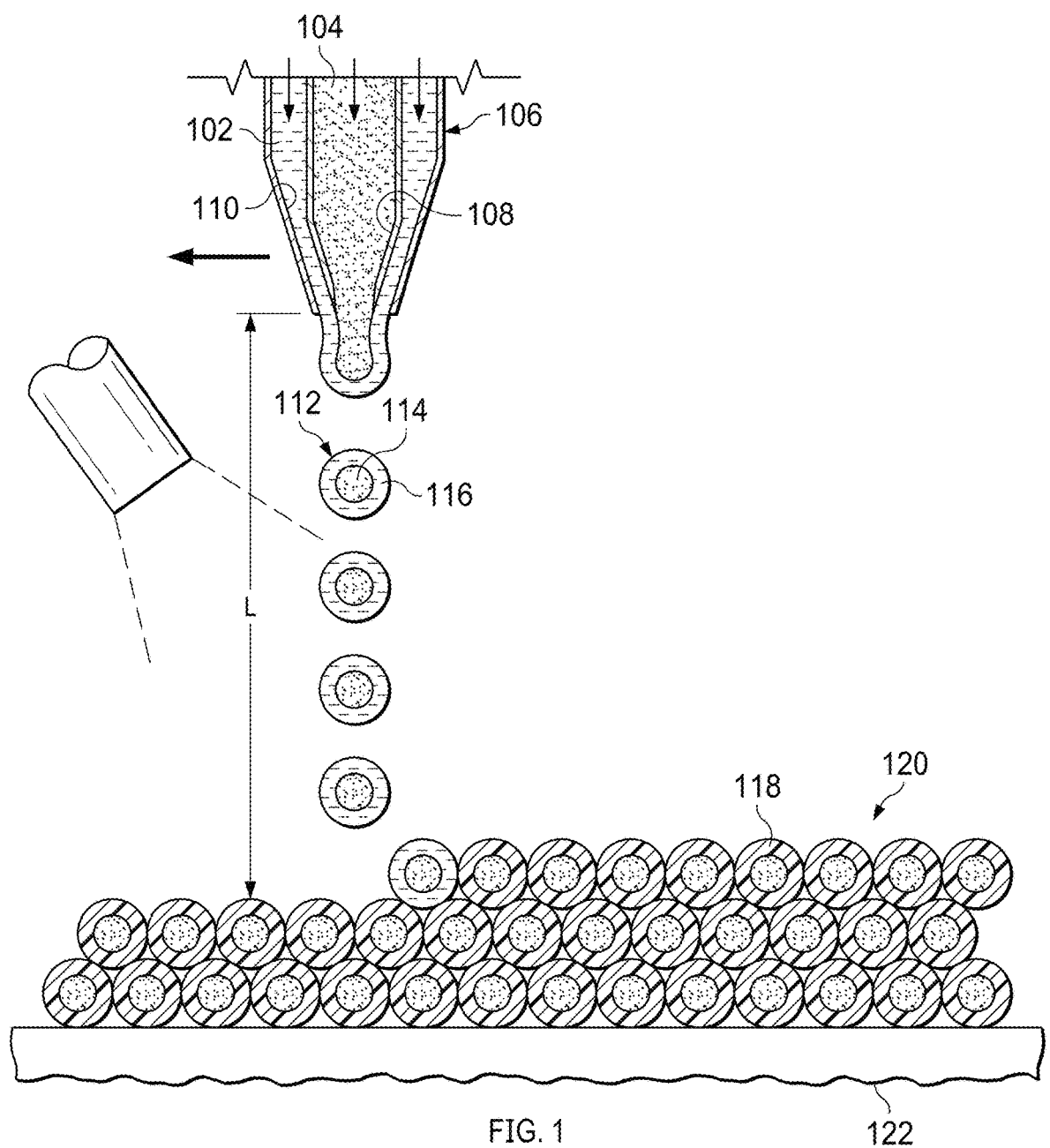
FIG. 1 is a schematic showing an exemplary bubble writing process where gas-filled bubbles are ejected from a core-shell nozzle and deposited on a substrate at a spatially controlled location. After ejection, the bubbles are solidified such that a cellular solid or foam having a predetermined geometry is formed on the substrate.

Referring to FIG. 1, the 3D printing or bubble writing method entails, according to one embodiment, introducing an ink formulation 102 and a gas 104 into a nozzle 106 comprising a core flow channel 108 radially surrounded by an outer flow channel 110; the ink formulation 102 is directed into the outer flow channel 110 and the gas 104 is directed into the core flow channel 108. The ink formulation 102 and the gas 104 are ejected out of the nozzle 106 as a stream of bubbles 112, where each bubble 112 includes a core 114 comprising the gas 108 and a liquid shell 116 overlying the core 114 that comprises the ink formulation 102. After ejection, the liquid shell 116 is solidified to form a solid shell 118, such that the bubbles 112 are solidified, and the bubbles 112 are deposited on a substrate 122 moving relative to the nozzle 106. One or more layers of the bubbles 112 may be deposited to fabricate a cellular solid 120 having a predetermined geometry.

The method may be applicable to any of a number of materials. The solid shells 118 and consequently the cellular solids 120 formed by direct bubble writing may comprise a metal, ceramic, semiconductor and/or polymer. The solid shells 118 of the bubbles 112 deposited on the substrate may serve as struts or walls (e.g., "cell walls") of the resulting 3D printed cellular solids 120, which are formed from single or multiple layers of contacting bubbles. The liquid shell 116 and the ink formulation 102 may include a flowable precursor to the metal, ceramic, semiconductor or polymer formed as a consequence of solidification. For example, in the case of a metal, the flowable precursor may comprise a molten metal or a dissolved metal salt. In the case of a ceramic, the flowable precursor may comprise a preceramic polymer or a suspension of ceramic particles. A suitable flowable precursor for a semiconductor may comprise a metal alkoxide or an organometallic precursor. In the example of a polymer, as discussed in greater detail below, the flowable precursor, which may also be referred to as a prepolymer, may comprise a polymerizable monomer. The rheology of the ink formulation may be controlled to permit an ink flow rate of at least about 0.03 ml/min and as high as about 300 ml/min, such as from about 0.03 ml/min to about 100 ml/min, from about 0.1 ml/min to about 50 ml/min, or, more typically, from about 3 ml/min to about 15 ml/min. In addition to the flowable precursor, the ink formulation and the liquid shell may include any additives deemed necessary or advantageous, such as a surfactant, a solvent, a chemical curing agent, a crosslinking agent, a photoinitiator, a thermal initiator, nanoparticles and/or a nanoparticle precursor.

The solidifying may entail freezing, evaporating (e.g., jamming), curing, crosslinking and/or polymerizing. For example, to effect solidification, the bubbles 112 may be exposed to a change in temperature (heating or cooling), light of a suitable wavelength, a dry atmosphere (to effect evaporation), or a chemical curing agent, such as a latent curing agent that may be included in the ink formulation. In another example, the liquid shell 116 may be solidified by exposure to a crosslinking agent in a liquid jet directed to impinge upon the ejected bubbles 112. Solidification of the liquid shell 116 may occur prior to, during, or after deposition of the bubbles 112 on the substrate 122. In other words, the bubbles 112 may be solidified prior to being deposited on the substrate 122; alternatively, the bubbles 112 may be solidified during deposition, or only after being deposited on the substrate 122.

In a preferred embodiment, the method is employed to fabricate a polymeric cellular solid 120. Accordingly, referring again to FIG. 1, the method may include introducing an ink formulation 102 comprising a flowable polymer precursor and a gas 104 into a nozzle 106 comprising a core flow channel 108 radially surrounded by an outer flow channel 110, where the ink formulation 102 is directed into the outer flow channel 110 and the gas 104 is directed into the core flow channel 108. The ink formulation 102 and the gas 104 are ejected out of the nozzle 106 as a stream of bubbles 112, where each bubble 112 includes a core 114 comprising the gas 104 and a liquid shell 116 overlying the core 114 that comprises the polymerizable monomer. After ejection, the flowable polymer precursor is cured (e.g., polymerized or crosslinked) to form a polymeric (solid) shell 118 from the liquid shell 116, such that the bubbles 112 are solidified. The bubbles 112 are deposited on a substrate moving relative to the nozzle and thus a polymeric cellular solid 120 is printed. Local properties of the polymeric cellular solid 120 may be determined by the gas species and/or the gas pressure during printing, as explained below.

Curing may entail exposing the bubbles 112 to light, heat, or a chemical curing agent, for example. In a preferred embodiment, the flowable polymer precursor comprises a polymerizable monomer (e.g., a photopolymerizable monomer), and the curing entails exposing the bubbles 112 to light, such as UV light, to effect polymerization. Suitable flowable polymer precursors may include polyepoxides, including aliphatic epoxides, alicyclic polyepoxides, and aromatic polyepoxides. Monofunctional and/or polyfunctional meth(acrylate) or acrylate containing monomers, oligomers, and polymers are particularly useful. Bireactive polymerizable monomers, oligomers, or polymers, for example, a compound having at least one free-radically polymerizable group, and at least one epoxy group may also be useful. Either free radical photoinitiators or cationic photoiniatiators or photobases, or combinations thereof may be used to initiate the polymerization of the polymer precursor. Additional initiators, for example thermal initiators, may also be included to further the extent of curing in an oven.

As indicated above, curing and thus solidification of the bubbles 112 may occur before, during, or after deposition of the bubbles 112 on the substrate 122. In one example, curing (e.g., polymerization) of an ejected bubble 112 may occur immediately after deposition on the substrate 122, such as within one second (1 s), within 0.5 s, within 0.2 s, or within 0.05 s of deposition.

It is possible to form nanocomposite cellular solids 120 by dispersing metal nanoparticles into the solid shell 118 of the bubbles 112. This may be achieved by, for example, incorporating a nanoparticle precursor such as a metal salt into the ink formulation 102 prior to bubble writing, and then reducing the metal salt during solidification of the liquid shell 116, thereby forming metal nanoparticles dispersed in the solid shell 118. For example, silver nanoparticles may be generated within a polymeric shell 118 by UV-induced reduction of silver nitrate that is dissolved in the ink formulation 102. Such nanoparticle-reinforced cellular solids 120 may be electrically and/or thermally conductive, and/or exhibit other properties imparted by the presence of the nanoparticles. In one example discussed below, a nanocomposite cellular solid 120 comprising metal nanoparticles is developed and utilized as a pressure sensor.

Figures 2A, 2B, 2C, 2D:
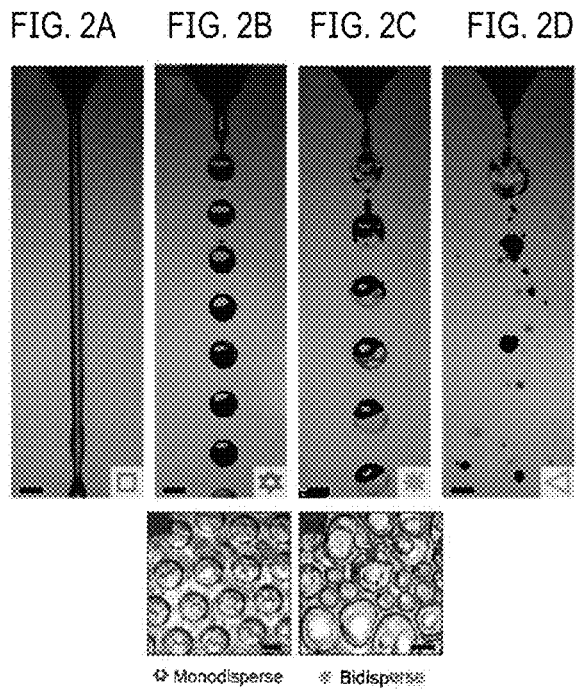
FIGS. 2A-2D show images of bubble morphology as a function of gas pressure applied to the nozzle for a given ink flow rate, where a continuous stream is ejected in FIG. 2A at low gas pressures, and a train of monodisperse bubbles (FIG. 2B), a train of bi- or tridisperse bubbles (FIG. 2C), and a spray of droplets (FIG. 2C) are ejected at increasingly higher gas pressures.

The gas 104 employed for bubble writing may comprise mixtures of gases such as air, or other gases such as oxygen, nitrogen, helium, and/or argon. Typically, the gas 104 is directed into the nozzle 106 at a pressure in a range from about 1 kPa to about 10 kPa, although a much larger range of gas pressures may be used (e.g., from about 0.1 kPa to 1000 kPa) depending on the size of the nozzle and ink parameters. Printing experiments have revealed that bubble ejection from the nozzle 106 may occur in four pressure-dependent regimes, as illustrated in FIGS. 2A-2D. At low gas pressures at a given ink flow rate (e.g., 10 mL/min), a pure-liquid jet or stream is ejected from the nozzle, as shown in FIG. 2A. Increasing the pressure at the same flow rate results in a train of monodisperse bubbles, as shown in FIG. 2B, followed by bifurcation to bi- or tridisperse bubbles at higher pressures, as shown in FIG. 2C. At further increased pressures at the same flow rate, a spray of droplets and bubbles with poorly defined directionality may be observed, as shown in FIG. 2D.

Figure 3A:
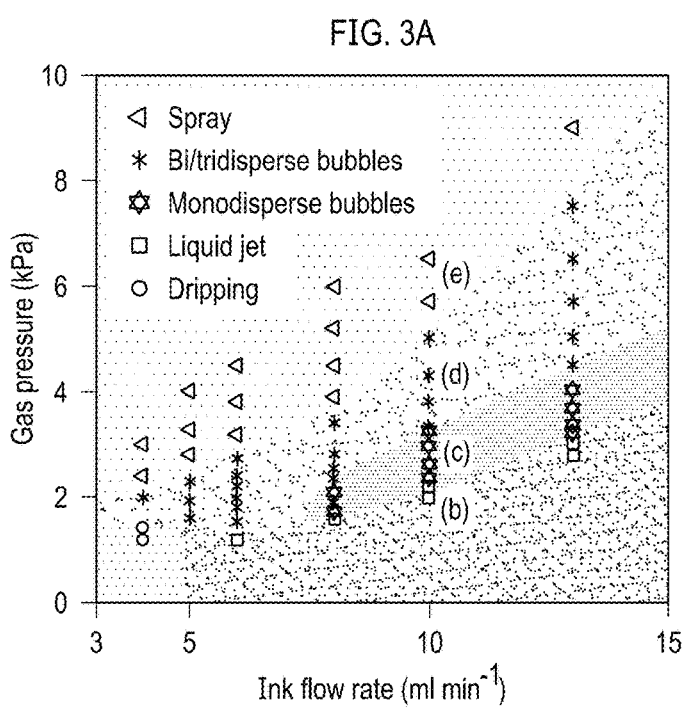
FIG. 3A shows a phase diagram of the ejection regimes shown in FIGS. 2A-2D as a function of the ink flow rate and the gas pressure.

FIG. 3A is a plot of gas pressure P as a function of ink flow rate Q that shows how the bubble morphology changes as a function of both of these parameters. The gas pressure may be understood to be the pressure at which the gas 104 is directed into the core flow channel 108. The plot identifies suitable conditions to obtain a train of monodisperse bubbles, which may be desirable for bubble writing. For example, the data of FIG. 3A show that the following conditions may be suitable: a gas pressure in a range from about 1.8 to 2.1 kPa at an ink flow rate of about 8 ml/min; a gas pressure in a range from about 2 to 3.2 kPa at an ink flow rate of about 10 ml/min; a gas pressure in a range from about 2.5 to 4 kPa at an ink flow rate of about 13 ml/min; and/or a gas pressure in a range from about 3.9 to about 4.5 kPa at a flow rate of about 15 ml/min. These values may depend on a number of factors, such as: the liquid density, surface tension, and/or viscosity; the design of the nozzle; and/or the inner and outer diameter of the nozzle. Furthermore, additional bubble ejection regimes may be revealed for different control parameters. For example, a continuous jet filled with monodisperse bubbles is observed when using liquids with higher viscosities between 15 and 500 mPa s. Generally speaking, a train of monodisperse bubbles may be attained at a suitable ink flow rate for gas pressures P ranging from about 1.8 kPa to about 5 kPa. Typically, the ink flow rate Q is in a range from about 7.5 ml/min to about 15 ml/min. The plot of FIG. 3A reveals that controlled bubble ejection may be obtained for the broadest range of gas pressures P at a flow rate Q=10 mL/min; thus, this flow rate is employed for a number of experiments described in this disclosure.

Figure 3B:
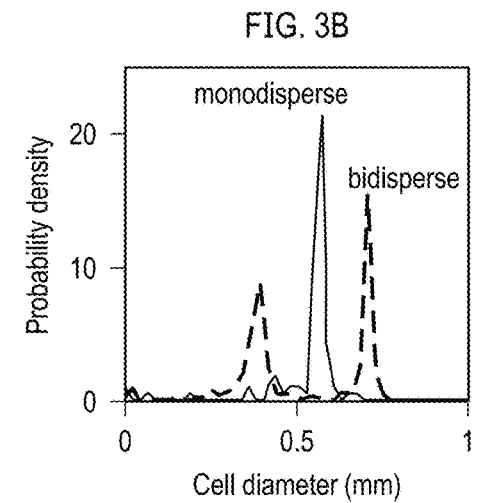
FIG. 3B shows cell size distributions for cellular solids formed from streams of monodisperse and bidisperse bubbles.
Figure 3C:
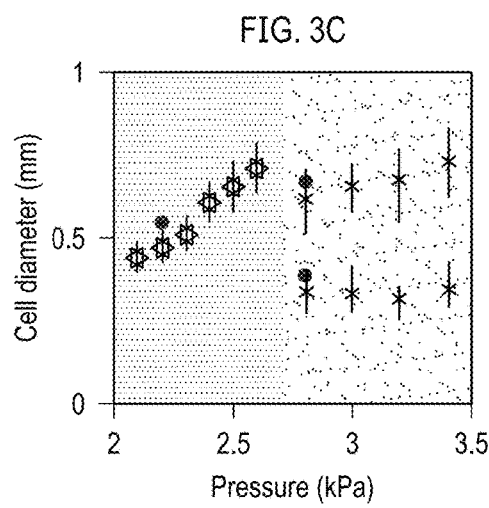
FIG. 3C show cell diameter as a function of gas pressure for cellular solids formed from streams of monodisperse and bidisperse bubbles.

A stream of monodisperse bubbles obtain at a suitable gas pressure and ink flow rate may be deposited to form cellular solids with a uniform cell size and quasi-crystalline packing, as can be seen by the images of FIG. 2B, where the top image shows monodisperse bubbles formed upon ejection from the nozzle and the bottom image shows the resulting cellular solid. The cell size distribution for the cellular solid of FIG. 2B is plotted in FIG. 3B, revealing a distinct dominant cell diameter (with a coefficient of variation of 4%) that may be tuned from 0.4 to 0.7 mm by increasing the gas pressure from 2.1 to 2.6 kPa, as shown in FIG. 3C. In general, the cells of the cellular solid may have a nominal size in a range from about 0.01 mm to about 10 mm, depending on the bubble writing parameters, with the range of about 0.1 mm to about 1 mm, or from about 0.3 mm to about 0.7 mm, being typical. A benefit of the method is that the cells may have a locally adjustable size and a locally adjustable interconnectivity. For example, cellular solids having a gradient in the cell size (e.g., cells ranging in size from small to large across all or a portion of the cellular solid) may be fabricated.

In another example, bidisperse cellular solids including both large and small cell sizes are possible. Bidisperse cellular solids (FIG. 2C, bottom image) produced from a stream of bidisperse bubbles (FIG. 2C, top image) are observed for gas pressures in the range 2.8≤P≤3.4 kPa. The bidisperse cellular solid of FIG. 2C has two dominant cell diameters of 0.3±0.1 and 0.7±0.1 mm, as can be observed in the top image of FIG. 2C along with the data of FIGS. 3B and 3C. At higher pressures, a tri-disperse distribution is observed for P=3.6 kPa, followed by a broad cell size distribution at P=4.8 kPa.

Figure 4A:
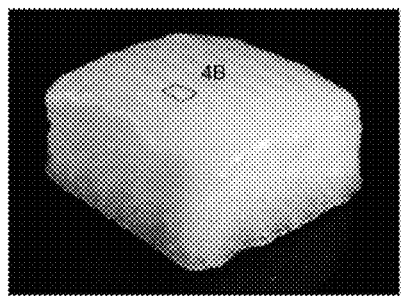
FIGS. 4A-4C show an exemplary cellular solid printed from a stream of monodisperse bubbles at different magnifications to demonstrate that both the macroscopic architecture of the cellular solid, as well as the micro-architecture (e.g., cell size and uniformity), may be tightly controlled.
Figure 4B:
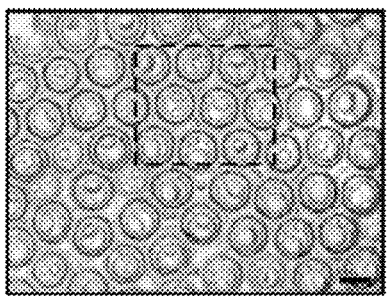
Figure 4C:
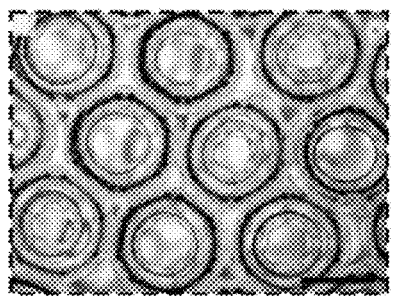

An exemplary cellular solid that is printed from a stream of monodisperse bubbles is shown at different magnifications in FIGS. 4A to 4C to demonstrate that both the macroscopic architecture of the cellular solid, as well as the micro-architecture (e.g., cell size and uniformity), may be tightly controlled. The macroscopic architecture of the cellular solid may be influenced by the path taken by the nozzle relative to the substrate as bubbles are ejected, as discussed further below. The length scale of both the individual pores or cells and the macroscopic shape are generally controlled by the bubble size and deposition location, respectively, but it may be further tuned by using "shrinking" polymers. For example, an ink formulation that includes a substantial amount of solvent (water) has been observed to decrease by about 30% in size upon evaporation of the solvent from the polymer shell.

Figure 5A:
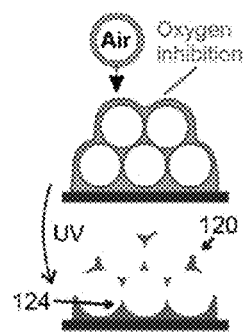
FIGS. 5A and 5B show formation mechanisms for cellular solids having open-cell (FIG. 5A) and closed-cell (FIG. 5B) architectures.
Figure 5A:
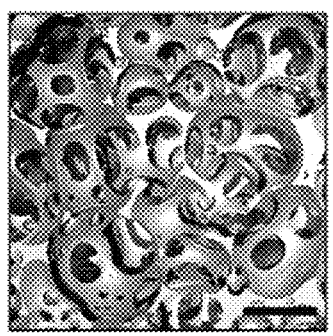
Figure 5B:
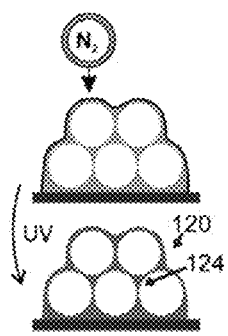
Figure 5B:
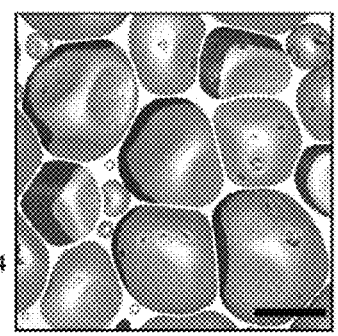

The cellular solid 120 may have an open-cell or closed-cell architecture. Open cell architectures may be formed by using air as the gas to fill the bubbles. This is because oxygen inhibits polymerization of the liquid shells 116 of the bubbles 112 which in turn become the cell walls 124 of the cellular solid 120, as illustrated in FIG. 5A. In contrast, closed-cell architectures may be formed if nitrogen is used as the gas, which leads to polymerization of intact cell walls 124, as illustrated in FIG. 5B.

Specifically, oxygen can penetrate the surface layer of the still-liquid cell walls and inhibit polymerization of an acrylate-based ink, as shown in the examples. The oxygen penetration depth is estimated as $\delta = (Dt_S)^{1/2} \approx 20$ µm, where $D \approx 2 \cdot 10^{-9}$ m$^2$s$^{-1}$ denotes the oxygen diffusion coefficient, and is $t_S \approx 200$ ms refers to the solidification time scale estimated using high-speed imaging. As the struts or walls between closed cells are typically thinner than 40 µm, oxygen can inhibit polymerization over the entire thickness, causing the liquid walls to eventually rupture. The struts have a typical thickness exceeding 100 µm, so only their surface may be oxygen-inhibited; the core may polymerize into a solid skeleton which constitutes an open-cell cellular solid as illustrated in FIG. 5A. In contrast, when oxygen is replaced with nitrogen, the struts or walls between cells entirely polymerize upon UV-exposure, resulting in closed-cell cellular solids as shown in FIG. 5B. Interestingly, the open-cell cellular solid shown in the microscope image of FIG. 5A has a similar density (131±5 kg/m$^3$) to that of the closed-cell cellular solid (122±5 kg/m$^3$) shown in the microscope image of FIG. 5B. Generally, the transition between open-cell and closed-cell architectures may be determined by competition between the rupture of the walls of the liquid bubbles (pores or cells) and the solidification time. Alternative methods to control the solidification rate (and thus solidification time) include the UV light intensity, the type and amount of photoinitiator, the type and amount of monomers or polymers, the temperature, the type and amount of chemicals that induce solidification, and the wall thickness. The rupture time can be tuned passively, for example, by changing the liquid viscosity or surface tension, the wall thickness (i.e., the gas-to-liquid ratio), the particle size in suspensions, the droplet size in emulsions, and/or the pressure of the surrounding environment. The rupture time can also be reduced actively, for example by rupturing the walls with a focused laser, vibrations, or mechanical puncture. Combined, these parameters can be tuned to control the transition between open- and closed cell foams.

Figure 6:
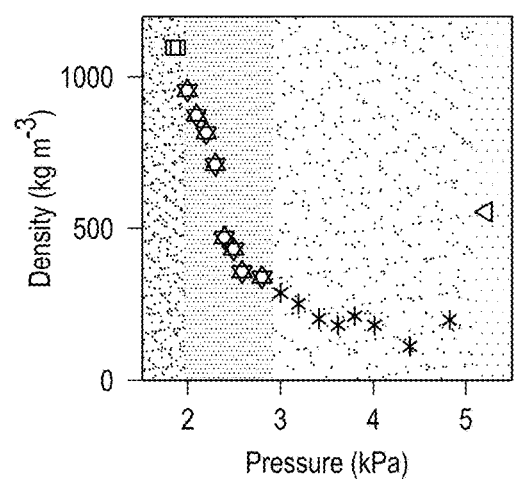
FIG. 6 is a plot of density of the cellular solid versus gas pressure, where the data symbols are identified in the legend of FIG. 3A.

The gas pressure may also influence the relative density, which may be expressed as % density (or, inversely, the fraction of porosity) of a cellular solid formed by bubble writing. At very low pressures, the cellular solid may be 100% dense (100% solid; no cells), while at much higher pressures, the cellular solid may be 10% or less dense (less than 10% solid fraction, where the gas-filled cells make up 90% or more of the cellular solid). Depending on the gas pressure, the cellular solid may be as low as 1% dense, or as low as 0.1% dense. The relationship between gas pressure and density is illustrated by the data of FIG. 6, which shows density of the cellular solid as a function of gas pressure applied to the nozzle, where the data symbols are identified by the legend of FIG. 3A. The data show, for example, that an all-solid cellular solid having a density $\rho_F = 1100$ kg m$^{-3}$ may be formed at a gas pressure P≤1.9 kPa, while a cellular solid having a 10% solid fraction $\rho_F = 115$ kg m$^{-3}$ may be formed at a gas pressure P=4.4 kPa.

The cellular solid 120 may have any three-dimensional macroscopic architecture that can be formed by x-, y-, and/or z-motion of the nozzle 106 relative to the substrate 122 during bubble ejection. As would be recognized by the skilled artisan, to achieve relative motion between the substrate 122 and the nozzle 106, one or both of the substrate 122 and the nozzle 106 may be moved. In other words, the substrate 122 may remain stationary while the nozzle 106 is moved, the nozzle 106 may remain stationary while the substrate 122 is moved, or both of the substrate 122 and the nozzle 106 may be moved. Typically, a nozzle 106 suitable for bubble writing may have sub-millimetric (e.g., less than about 1 mm) internal dimensions and thus may be classified as a millifluidic or microfluidic device. For example, the exemplary nozzles 106 employed for the experiments described in this disclosure have internal dimensions (e.g., a nozzle opening or outlet) in the range from about 200 microns to about 500 microns.

In one implementation, typical velocities of the nozzle 106 relative to the substrate 122 range from about 1 mm/s to about 300 mm/s. For print velocities V greater than 20 mm/s, filaments made up of bubbles may be formed as shown in FIG. 7A. The exemplary filaments shown from left to right in FIG. 7A are formed by translating the nozzle operated at a gas pressure of 2.4 kPa at a velocity of 35 mm/s, 70 mm/s, 150 mm/s, and 250 mm/s, respectively. The data of FIG. 7B show that the width of the filament increases for increasing pressures or decreasing x-y velocities of the nozzle.

Bubble writing may be carried out in air or in a controlled environment (e.g., oxygen, nitrogen, helium, and/or argon) at atmospheric pressure or at a reduced pressure (e.g., vacuum conditions).

As the bubbles are solidified (e.g., within 0.2 second after impact or deposition), they may be readily stacked into large, multi-scale cellular solids, as shown for example in FIGS. 8A-8D. This exemplary cellular solid, with outer dimensions of 60×40×3 cm$^3$, was printed in only 22 minutes, as the liquid flow rate of 10 mL/min was increased to about 80 mL/min by the entrainment of air. In another example, vertical filaments or pillars of controlled height may be fabricated by immobilizing the printhead (nozzle) for a fixed duration as bubbles are ejected. Moving the printhead at low x-y velocity, e.g., V<14 mm/s, may enable control over the inclination angle of these pillars with respect to the substrate. Bridges may be formed by touching pillar tips out-of-plane. The transition between inclined pillars to horizontal filaments is observed to occur at a velocity V=15±0.5 mm s$^{-1}$, at which horizontal overhangs (90°) may be formed.

Figure 9A:
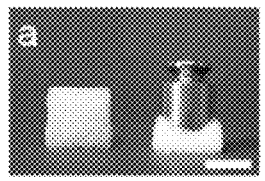
FIGS. 9A and 9B show photographs of cellular solids of different stiffness undergoing compression.
Figure 9B:
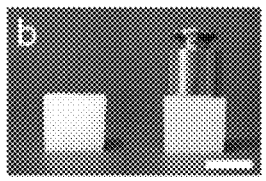
Figure 9C:
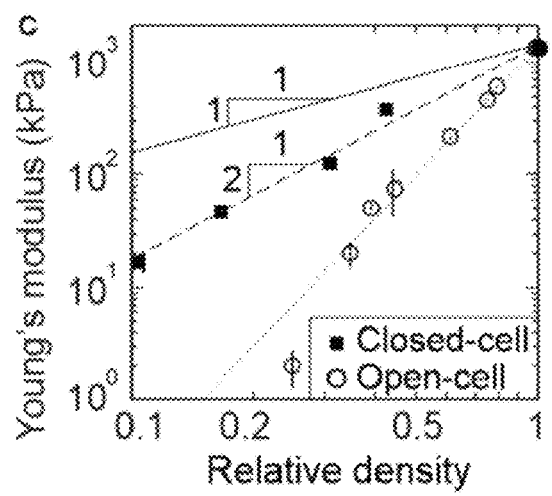
FIG. 9C shows a plot of Young's modulus versus relative density for cellular solids having closed-cell and open-cell architectures.

Combining tunable micro-architectures, as shown for example in FIGS. 5A and 5B, with programmable 3D macro-architectures, as shown for example in FIG. 8A, enables cellular solids with locally tailorable mechanical properties to be fabricated. For example, stiffness may be controlled as illustrated in FIGS. 9A-9C, where the photographs show the behavior of a soft cellular solid and a stiff cellular solid, respectively, upon application of a 100 g mass. The elastic modulus E (stiffness) may be tuned over multiple orders of magnitude, as shown by the data of FIG. 9C, by varying the relative density of a cellular solid prepared by bubble writing. The soft and stiff cellular solids of FIGS. 9A and 9B have open-cell architectures at different relative densities ($\rho_{rel}$). The data in FIG. 9C cover the relative density range of $0.1 < \rho_{rel} < 1$, but it is recognized that the relative density of the cellular solids may be controlled over a much larger range, e.g., $0.001 < \rho_{rel} < 1$, via bubble writing.

Theory predicts a power-law $$\frac{E}{E_0} \sim (\rho_{rel})^n,$$

where $$\rho_{rel} = \frac{\rho}{\rho_0}$$

is the relative density and $\rho_0$ and $E_0$ denote the bulk density and elasticity, respectively. An exponent $n=2$ is predicted and widely observed for open-cell solids, whereas $1 < n < 2$ is predicted for closed-cell solids with increasingly thin walls. Although these values are derived for $\rho_{rel} < 0.1$, they are usually still accurate at higher densities for a wide range of solids. For closed-cell foams, a value of $n \approx 2$ is observed. This high value indicates that the faces are significantly contributing to the stiffness, which is hardly surprising in view of their low thickness. For open-cell solids, $n \approx 4$ is observed. This high value may be attributable to relatively thin struts formed due to partial oxygen inhibition during polymerization. Thus, for cellular solids formed by direct bubble writing, values of n may range from about $2 \leq n \leq 4$. In future implementations, this exponent may decrease to lower values, but may not be lower than 1.

Figure 10A:
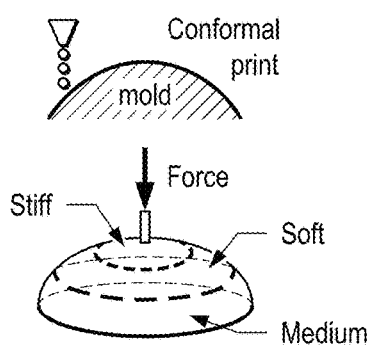
FIG. 10A is a schematic of conformal printing onto a mold to form a cap comprising stiff and soft regions.
Figure 10B:
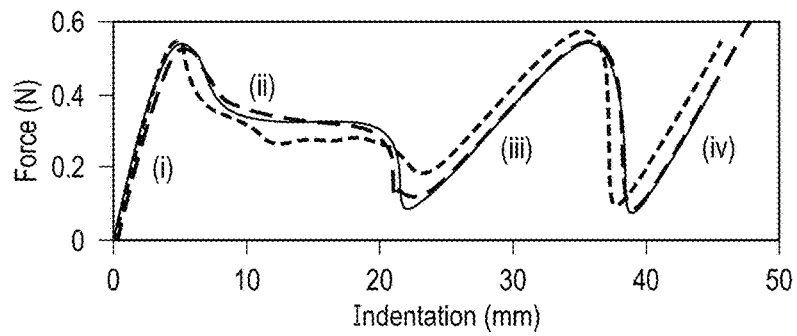
FIG. 10B is a plot of force versus indentation depth for the cap of FIG. 10A.
Figure 10C:
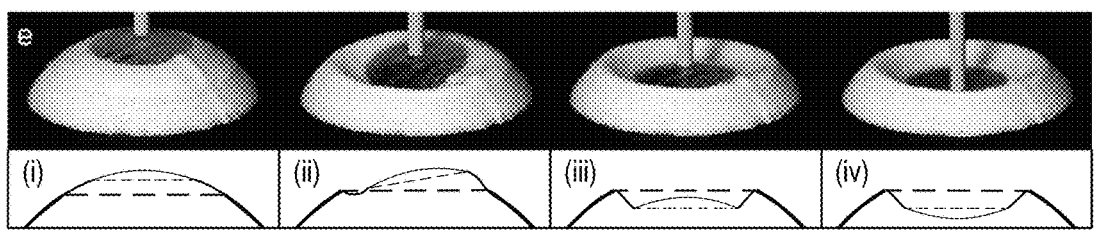
FIG. 10C shows images and schematics of the cap acquiring different shapes upon continued compression from the top, of which examples (i), (iii), and (iv) are stable, as reflected by the force-indentation curve shown in FIG. 10B.

High values of n indicate exceptional stiffness tunability over a moderate density range, which is exploited for conformal printing of an exemplary tri-stable cap with stiff and soft regions, as illustrated in FIG. 10A. As shown in FIG. 10C, this cap snaps into different shapes upon continued compression from the top, of which examples (i), (iii), and (iv) are stable as reflected by the force-indentation curve shown in FIG. 10B. As such gradients in stiffness can be applied at any location, direct bubble writing enables one-step manufacture of 3D-architectured materials that bend or cushion in a locally optimized fashion.

Figure 11:
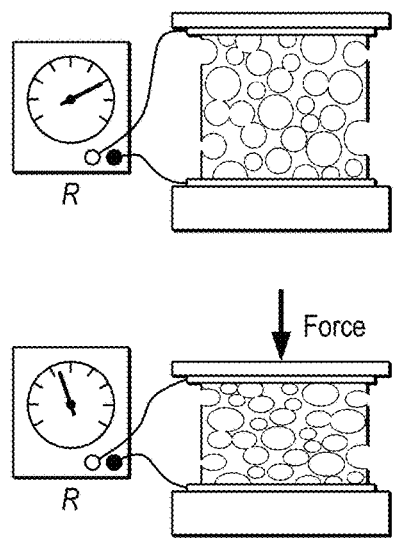
FIG. 11 shows controlled compression of a cellular solid between two electrodes to measure electrical resistance as a function of compressive stress.
Figure 12A:
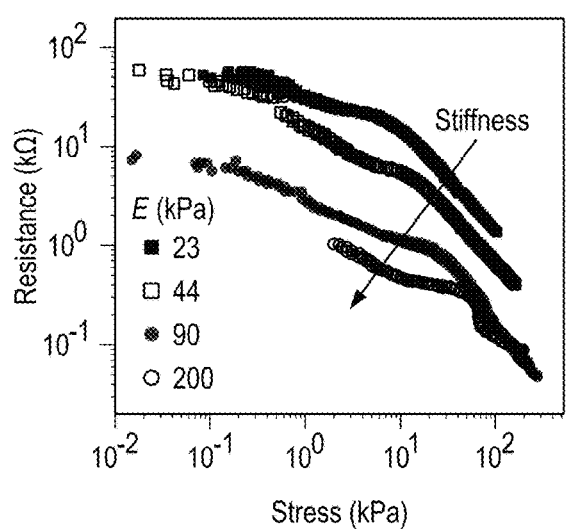
FIG. 12A shows resistance as a function of compressive stress for cellular solids having different elastic moduli, as indicated.
Figure 12B:
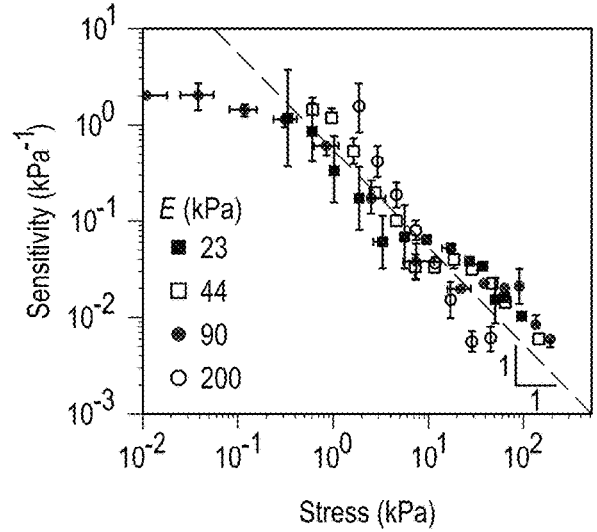
FIG. 12B shows sensitivity as a function of stress for the cellular solids; the data reveal that sensitivity is inversely proportional to stress and collapses to a universal trend for all evaluated stiffness values.

As indicated above, nanocomposite cellular solids 120 may be formed by dispersing nanoparticles (e.g., metal nanoparticles) in the cell walls 124. In one example, a nanocomposite cellular solid including silver nanoparticles is developed and utilized as a pressure sensor. It is found that the nanocomposite cellular solid exhibits an elastic modulus comparable to a cellular solid prepared under the same conditions but without nanoparticle reinforcement. To determine the influence of the metal nanoparticles on the conductivity, electric resistance is measured by controlled compression between two electrodes, as illustrated in FIG. 11, for nanocomposite cellular solids having different elastic moduli. The resistance data shown in FIG. 12A reveal monotonically decreasing values of resistance as a function of compressive stress and stiffness. To assess the sensing performance of these cellular solids, the sensitivity $$S = \left(\frac{dR}{R}\right)\Big/ dP$$

is determined as shown in FIG. 12B. The inversely proportional dependency on the compressive stress indicates that the pressure sensing error is constant over the full material and pressure range. Direct bubble writing enables one-step fabrication of pressure sensors with controlled shape and tunable stiffness for a stress range that includes both gentle touch (<10 kPa) and object manipulation (10 to 100 kPa). These sensors maintain their elasticity under moderate compression, and thus can be used repeatedly. For example, low-density cellular solids (e.g., where $$\rho_{rel} = \frac{\rho}{\rho_0}$$

is about 0.2 or less) may exhibit elastic behavior up to 60% strain in the 0.2 to 20 kPa range, and high-density cellular solids (e.g., where $\rho_{rel}$ is around 0.4, such as from 0.3 to 0.5) may be elastic up to 40% strain over a large stress range from 0.5 to 100 kPa.

Materials and Methods

Ink formulation: Poly(ethyleneglycol)diacrylate ($M_n$ 700) (Sigma), Tween 80 (Sigma), Irgacure 651 (BASF), deionized water, and nitrogen are obtained at the highest purity available and used without further purification unless otherwise specified. For 100 g of the ink formulation: PEG-DA (35 g), Tween 80 (2 g) and Irgacure 651 (0.4 g) are combined and mixed using Flacktek speed mixer for 10 minutes at 2350 rpm. Deionized water (62.6 g) is then stirred into the mixture for 30 seconds. The resulting ink formulation is then kept from light to prevent photopolymerization prior to usage. A conductive ink formulation for use in printing a nanocomposite cellular solid is prepared by adding an additional 10 g of a nanoparticle precursor, specifically, silver nitrate (a metal salt), to the mixture. Subsequently, the ink formulation (with or without the metal salt addition) is purged with nitrogen for 20 minutes prior to usage. The syringes are filled with the ink formulation in an oxygen-free atmosphere.

Ink and gas supply: The ink formulation is supplied with a syringe pump (Harvard Apparatus), on which two 60-mL plastic syringes (Becton-Dickinson) containing the ink formulation are mounted. Their flows (5 mL min$^{-1}$ per syringe) are combined by a T-junction and supplied to the nozzle with standard PEEK tubing and Luer-lok components (IDEX Health&Science). This tubing is sufficiently long and flexible to bridge the gap between the syringe pump and the moving printhead (nozzle). The gas pressure is controlled with a computer-controlled pressure box (Alicat PC-15PSIG-D). Either house air or nitrogen tanks (AirGas) are used.

Print process: A dedicated printhead is employed for direct bubble writing. A nozzle and ends of a splitting optical fiber are mounted onto an automated 3D-stage (Aerotech), of which the motion path is programmed in G-code (or RS-274). Disposable core-shell nozzles suitable for bubble writing are 3D-printed using an Envisiontec Aureus printer. The nozzle inlets are connected to PEEK tubing (IDEX Health & Science) using standard Luer-lok components (IDEX Health&Science). Inside the nozzle, the core flow channel and the outer flow channel are concentrically aligned. Nozzles with inner and outer diameters of 0.30±0.02 mm and 0.44±0.02 mm, respectively, are selected after printing to minimize variability. UV light is provided by an Omnicure light source (Omnicure S2000, Excelitas technologies), to which a splitting optical fiber is connected. The four ends of this fiber are pointed towards the bubble impact location, providing a relatively homogeneous intensity of 0.8±0.2 mW cm$^{-2}$ over a circular area with a diameter of 5 cm at the deposition plane (at a length L of about 10 cm from the nozzle).

Imaging: A live view of the train of bubbles during printing is provided by a Q-click F-M12 camera (Qimaging) set to a shutter time of 30 μs. High-speed videos are obtained by a V7.1 (Phantom) camera operated at 6000 frames per second. Illumination for the camera is provided with a standard light source (Thorlabs, OSL 2).

Print path: The cellular solid shown in FIGS. 8A and 8B is printed in a log pile pattern. For typical samples, the distance between lines in the log pile is from about 4 mm to 7 mm, and the printing velocity is set to 40 mm s$^{-1}$ (for low-pressures) to 100 mm s$^{-1}$ (for high pressures). The z-position of the nozzle is not adjusted during printing of these samples. Vertical pillars are formed by immobilizing the printhead. Inclined pillars are printed by moving the printhead at V<10 mm s$^{-1}$. V-shaped bridges are made by printing two inclined pillars from their base and connecting their tips. The spherical cap of FIGS. 10A-10C is printed onto a mold, as shown in FIG. 10A, using an approach that may be referred to as conformal printing. The cap is manually removed from the mold after fabrication.

Post-curing: For nanocomposite cellular solids, the top and bottom sides of printed samples are exposed to broadband UV light as provided by the Omnicure UV source, for 10 minutes per side, to enhance the formation of nanoparticles.

Drying: After printing, the cellular solids are stored in a drying cabinet to which water-absorbing grains (Drierite, VWR) are added and regularly replaced (typically once per two days) to keep the humidity between 70% and 85%. Humidity below 70% is observed to result in cracking, especially for relatively dense samples and closed-cell cellular solids. After several days, the cellular solids are fully dry (up to 3 weeks for the larger closed-cell samples), as observed from a sudden drop of the humidity in the chamber to 30% or less. The size and weight are measured before and after drying for 18 samples that underwent direct writing at gas pressures in the range from 2.2 kPa to 5.6 kPa. Virtually isotropic shrinkage is observed, at 27.8±1.1% in x-y direction and 28.0±2.1% in z-direction. Combined, shrinkage and mass loss during drying (59±1%) result in a density increase of 9%.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A method of printing a cellular solid on a substrate, the method comprising:
introducing an ink formulation and a gas into a nozzle comprising a core flow channel radially surrounded by an outer flow channel, the ink formulation being directed into the outer flow channel and the gas being directed into the core flow channel;
ejecting the ink formulation and the gas out of the nozzle as a stream of bubbles, each bubble including a core comprising the gas and a liquid shell overlying the core and comprising the ink formulation;
after ejection, solidifying the liquid shell to form a solid shell within one second after deposition of the bubbles on the substrate; and
moving the substrate and the nozzle relative to one another according to a predetermined geometry, thereby printing a solid three-dimensional cellular structure having said predetermined geometry.

2. The method of claim 1, wherein each of the solid shells comprises a metal, ceramic, semiconductor, and/or polymer.

3. The method of claim 1, wherein solidifying comprises freezing, evaporating, curing, crosslinking, and/or polymerizing.

4. The method of claim 1, wherein the stream of bubbles is a monodisperse stream of bubbles.

5. The method of claim 1, wherein the ink formulation further comprises a nanoparticle precursor.

6. The method of claim 5, wherein the nanoparticle precursor comprises a metal salt, and wherein, during solidification of the liquid shell, the metal salt is reduced to form metal nanoparticles dispersed in the solid shell.

7. The method of claim 1, wherein the gas is selected from the group consisting of: air, oxygen, nitrogen, helium and argon.

8. The method of claim 1, wherein the gas is directed into the nozzle at a pressure in a range from 1 kPa to 10 kPa.

9. The method of claim 1, wherein a flow rate of the ink formulation is in a range from 3 ml/min to 15 ml/min.

10. The method of claim 1, wherein the cellular solid comprises a closed cell microarchitecture.

11. The method of claim 1, wherein the cellular solid comprises an open cell microarchitecture.

12. The method of claim 1, wherein cells of the cellular solid have a nominal size in a range from 0.01 mm to 10 mm.

13. The method of claim 1, wherein the nozzle moves relative to the substrate at a translation speed in a range from 1 mm/s to 300 mm/s.

14. The method of claim 1, wherein the cellular solid is configured for pressure sensing, sound control, heat exchange, catalysis, and/or mechanical energy absorption.

15. A method of printing a cellular solid on a substrate, the method comprising:
introducing an ink formulation comprising a flowable polymer precursor and a gas into a nozzle comprising a core flow channel radially surrounded by an outer flow channel, the ink formulation being directed into the outer flow channel and the gas being directed into the core flow channel;
ejecting the ink formulation and the gas out of the nozzle as a stream of bubbles, each bubble including a core comprising the gas and a liquid shell overlying the core comprising the ink formulation;
after ejection, curing the flowable polymer precursor prior to one second after deposition of the bubbles on the substrate to form a solid polymeric shell from the liquid shell, the bubbles thereby being solidified; and
depositing the bubbles on the substrate, while moving the nozzle and the substrate relative to one another according to a predetermined geometry, thereby printing a solid cellular structure having said predetermined geometry.

16. The method of claim 15, wherein curing the flowable polymer precursor comprises exposing the bubbles to light, heat or a chemical curing agent.

17. The method of claim 15, wherein the flowable polymer precursor comprises a polymerizable monomer.

18. The method of claim 17, wherein the polymerizable monomer is a photopolymerizable monomer, and wherein the polymerizing comprises exposing the bubbles to ultra-violet (UV) light.

19. The method of claim 15, wherein the ink formulation includes a nanoparticle precursor.

20. The method of claim 19, wherein the nanoparticle precursor comprises a metal salt, and wherein, during curing of the liquid shell, the metal salt is reduced to form metal nanoparticles dispersed in the solid shell.

21. The method of claim 15, wherein the stream of bubbles is a monodisperse stream of bubbles.

22. The method of claim 15, wherein the gas is selected from the group consisting of: air, oxygen, nitrogen, helium and argon.

23. The method of claim 15, wherein the gas is directed into the nozzle at a pressure in a range from 1 kPa to 10 kPa.

24. The method of claim 15, wherein a flow rate of the ink formulation is in a range from 3 ml/min to 15 ml/min.

25. The method of claim 15, wherein the cellular structure comprises a closed cell microarchitecture.

26. The method of claim 15, wherein the cellular structure comprises an open cell microarchitecture.

27. The method of claim 15, wherein pores of the cellular structure have a nominal size in a range from 0.3 mm to 0.7 mm.

28. The method of claim 15, wherein the nozzle is moved relative to the substrate at a translation speed in a range from 1 mm/s to 300 mm/s.

29. The method of claim 15, wherein the cellular solid is configured for pressure sensing, sound control, heat exchange, catalysis, and/or mechanical energy absorption.

30. The method of claim 15, wherein the cellular solid comprises locally controlled gradients in pore size, interconnectivity, and/or material composition.

* * * * *